US009185745B2

(12) United States Patent
Ghosh et al.

(10) Patent No.: US 9,185,745 B2
(45) Date of Patent: Nov. 10, 2015

(54) METHOD, APPARATUS, AND COMPUTER PROGRAM PRODUCT FOR RELAY OPERATION IN WI-FI NETWORKS

(71) Applicant: Nokia Corporation, Espoo (FI)

(72) Inventors: Chittabrata Ghosh, Freemont, CA (US); Sayantan Choudhury, Berkeley, CA (US); Klaus Franz Doppler, Albany, CA (US); Esa Tuomaala, Emeryville, CA (US)

(73) Assignee: Nokia Technologies OY, Espoo (FI)

( * ) Notice: Subject to any disclaimer, the term of this patent is extended or adjusted under 35 U.S.C. 154(b) by 77 days.

(21) Appl. No.: 13/669,855

(22) Filed: Nov. 6, 2012

(65) Prior Publication Data

US 2014/0126461 A1    May 8, 2014

(51) Int. Cl.
| H04W 88/04 | (2009.01) |
| H04W 16/26 | (2009.01) |
| H04W 52/24 | (2009.01) |
| H04W 72/04 | (2009.01) |
| H04W 16/14 | (2009.01) |

(52) U.S. Cl.
CPC .............. *H04W 88/04* (2013.01); *H04W 16/14* (2013.01); *H04W 16/26* (2013.01); *H04W 52/244* (2013.01); *H04W 72/0446* (2013.01); *Y02B 60/50* (2013.01)

(58) Field of Classification Search
CPC ... H04W 72/04; H04W 72/0473; H04W 4/06; H04W 88/04
USPC .................................. 370/315, 311, 328–338
See application file for complete search history.

(56) References Cited

U.S. PATENT DOCUMENTS

| 7,149,539 | B2* | 12/2006 | Backes et al. ................. 455/522 |
| 7,466,985 | B1* | 12/2008 | Handforth et al. ............ 455/454 |
| 8,036,696 | B2* | 10/2011 | Hall .............................. 455/522 |
| 2010/0322159 | A1* | 12/2010 | Ko et al. ....................... 370/329 |
| 2011/0319088 | A1* | 12/2011 | Zhou et al. .................... 455/442 |
| 2013/0077554 | A1 | 3/2013 | Gauvreau et al. |
| 2013/0128798 | A1* | 5/2013 | Liu ............................... 370/312 |
| 2014/0056209 | A1* | 2/2014 | Park et al. ..................... 370/315 |
| 2014/0071900 | A1* | 3/2014 | Park .............................. 370/329 |
| 2014/0105186 | A1* | 4/2014 | Park et al. ..................... 370/336 |

OTHER PUBLICATIONS

M. Effros, A. Goldsmith, and M. Medard, "The Rise of Instant Wireless Networks", Scientific American, pp. 72-77, Apr. 2010.*
Alcatel-Lucent, Simulation results of macro-cell and co-channel Home NodeB with power configuration and open access, Alcatel-Lucent, 3GPP TSG-RAN WG4 Meeting #44bis, Shanghai, China, Oct. 8-12, 2007)-R4-071578.*

(Continued)

*Primary Examiner* — Chi H Pham
*Assistant Examiner* — Shailendra Kumar
(74) *Attorney, Agent, or Firm* — Locke Lord LLP

(57) ABSTRACT

Embodiments of the invention provide signaling mechanisms for wireless networks composed of a large number of stations. An example method embodiment comprises: determining, by a wireless relay device, a first time window allocated for a first network, allowing first maximum transmit power for packet transmissions; and determining, by the wireless relay device, a second time window allocated for a second network, wherein the second time window is allowed for transmissions also within the first network, but only with second maximum transmit power that is lower than the first maximum transmit power.

21 Claims, 10 Drawing Sheets

(56) References Cited

OTHER PUBLICATIONS

M. Park: IEEE P802.11; Wireless LANs; 11-11-1137-05-00ah-specification-framework-for-tgah; Jan. 2012.
M. Park: IEEE P802.11; Wireless LANs; 11-11-1137-09-00ah-specification-framework-for-tgah; May 2012.
M. Park: IEEE P802.11; Wireless LANs; 11-11-1137-10-00ah-specification-framework-for-tgah; Jul. 2012.
Zhong Yi Jin, et al.,: IEEE P802.11; Wireless LANs; 11-11-1512-04-00ah-mac-considerations-for-802-11ah; Nov. 2011.
Y. Bitran, et al., Solving the coexistence of WiMAX, Bluetooth and WiFi in converged handsets, http://www.eetinnes.com/General/PrintView/4016228, dated Apr. 19, 2013, pp. 1-5.

* cited by examiner

FIG. 7

WIRELESS RELAY DEVICE

700

STEP 702: DETERMINING, BY A WIRELESS RELAY DEVICE, A FIRST TIME WINDOW ALLOCATED FOR A FIRST NETWORK, ALLOWING FIRST MAXIMUM TRANSMIT POWER FOR PACKET TRANSMISSIONS; AND

STEP 704: DETERMINING, BY THE WIRELESS RELAY DEVICE, A SECOND TIME WINDOW ALLOCATED FOR A SECOND NETWORK, WHEREIN THE SECOND TIME WINDOW IS ALLOWED FOR TRANSMISSIONS ALSO WITHIN THE FIRST NETWORK, BUT ONLY WITH SECOND MAXIMUM TRANSMIT POWER THAT IS LOWER THAN THE FIRST MAXIMUM TRANSMIT POWER.

METHOD, APPARATUS, AND COMPUTER PROGRAM PRODUCT FOR RELAY OPERATION IN WI-FI NETWORKS

FIELD

The field of technology relates to wireless communication and more particularly to signaling mechanisms for wireless networks composed of a large number of stations.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long range communication networks, like GSM, are a well-accepted means for transmitting and receiving data, due to cost, traffic and legislative concerns, these networks may not be appropriate for all data applications.

Short range communication technologies provide communication solutions that avoid some of the problems seen in large cellular networks. BLUETOOTH™ protocol is an example of a short range wireless technology quickly gaining acceptance in the marketplace. In addition to BLUETOOTH™ protocol other popular short range communication technologies include BLUETOOTH™ protocol Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments are disclosed for wireless networks composed of a large number of stations.

An example embodiment of the invention includes a method comprising:

determining, by a wireless relay device, a first time window allocated for a first network, allowing first maximum transmit power for packet transmissions; and determining, by the wireless relay device, a second time window allocated for a second network, wherein the second time window is allowed for transmissions also within the first network, but only with second maximum transmit power that is lower than the first maximum transmit power.

An example embodiment of the invention includes a method comprising:

wherein the first network is a relay sub-network and the second network is a long range network.

An example embodiment of the invention includes a method comprising:

wherein the wireless relay device serves as a relay between the second network and stations in the first network.

An example embodiment of the invention includes a method comprising:

wherein the first time window and the second time window share at least partly a beacon interval of the access point in the second network.

An example embodiment of the invention includes a method comprising:

wherein determining the first time window comprises sending a request to the access point and receiving a response.

An example embodiment of the invention includes a method comprising:

wherein determining the second time window comprises receiving a beacon message.

An example embodiment of the invention includes a method comprising:

wherein the second network is a wireless local area network.

An example embodiment of the invention includes a method comprising:

wherein the second network is a sensor network.

An example embodiment of the invention includes a method comprising:

wherein a maximum transmit power for the first time window is received in a message from the access point.

An example embodiment of the invention includes a method comprising:

wherein the first and second time windows are restricted access windows for IEEE 802.11ah technology.

An example embodiment of the invention includes an apparatus comprising:

at least one processor;

at least one memory including computer program code;

the at least one memory and the computer program code configured to, with the at least one processor, cause the apparatus at least to:

determine a first time window allocated for a first network, allowing first maximum transmit power for packet transmissions; and determine a second time window allocated for a second network, wherein the second time window is allowed for transmissions also within the first network, but only with second maximum transmit power that is lower than the first maximum transmit power.

An example embodiment of the invention includes an apparatus comprising:

wherein the first network is a relay sub-network and the second network is a long range network.

An example embodiment of the invention includes an apparatus comprising:

wherein the wireless relay device serves as a relay between the second network and stations in the first network.

An example embodiment of the invention includes an apparatus comprising:

wherein the first time window and the second time window share at least partly a beacon interval of the access point in the second network.

An example embodiment of the invention includes an apparatus comprising:

wherein determining the first time window comprises sending a request to the access point and receiving a response.

An example embodiment of the invention includes an apparatus comprising:

wherein determining the second time window comprises receiving a beacon message.

An example embodiment of the invention includes an apparatus comprising:

wherein the second network is a wireless local area network.

An example embodiment of the invention includes an apparatus comprising:

wherein the second network is a sensor network.

An example embodiment of the invention includes an apparatus comprising:

wherein a maximum transmit power for the first time window is received in a message from the access point.

An example embodiment of the invention includes an apparatus comprising:

wherein the first and second time windows are restricted access windows for IEEE 802.11ah technology.

An example embodiment of the invention includes a computer program product comprising computer executable program code recorded on a computer readable, non-transitory storage medium, the computer executable program code comprising:

code for determining, by a wireless relay device, a first time window allocated for a first network, allowing first maximum transmit power for packet transmissions; and code for determining, by the wireless relay device, a second time window allocated for a second network, wherein the second time window is allowed for transmissions also within the first network, but only with second maximum transmit power that is lower than the first maximum transmit power.

An example embodiment of the invention includes a method comprising:

wherein the second time window is used for at least one of: transmissions between the wireless relay device and an access point within the second network with normal transmit power, and transmissions between another station and the access point within the second network with normal transmit power and no first network transmissions.

An example embodiment of the invention includes an apparatus comprising:

wherein the second time window is used for at least one of: transmissions between the wireless relay device and an access point within the second network with normal transmit power, and transmissions between another station and the access point within the second network with normal transmit power and no first network transmissions.

An example embodiment of the invention includes a method comprising:

wherein determining the first time window comprises receiving a beacon from the access point, specifying the first time window.

An example embodiment of the invention includes an apparatus comprising:

wherein determining the first time window comprises receiving a beacon from the access point, specifying the first time window.

An example embodiment of the invention includes a method comprising:

wherein the first network is a Wi-Fi DIRECT™ protocol peer-to-peer group.

An example embodiment of the invention includes an apparatus comprising:

wherein the first network is a Wi-Fi DIRECT™ protocol peer-to-peer group.

The resulting example embodiments provide signaling mechanisms for wireless networks composed of a large number of stations.

DESCRIPTION OF THE FIGURES

FIG. 7 is an example flow diagram of operational steps in the wireless relay device, according to an example embodiment of the invention.

DISCUSSION OF EXAMPLE EMBODIMENTS OF THE INVENTION

Figure 1:
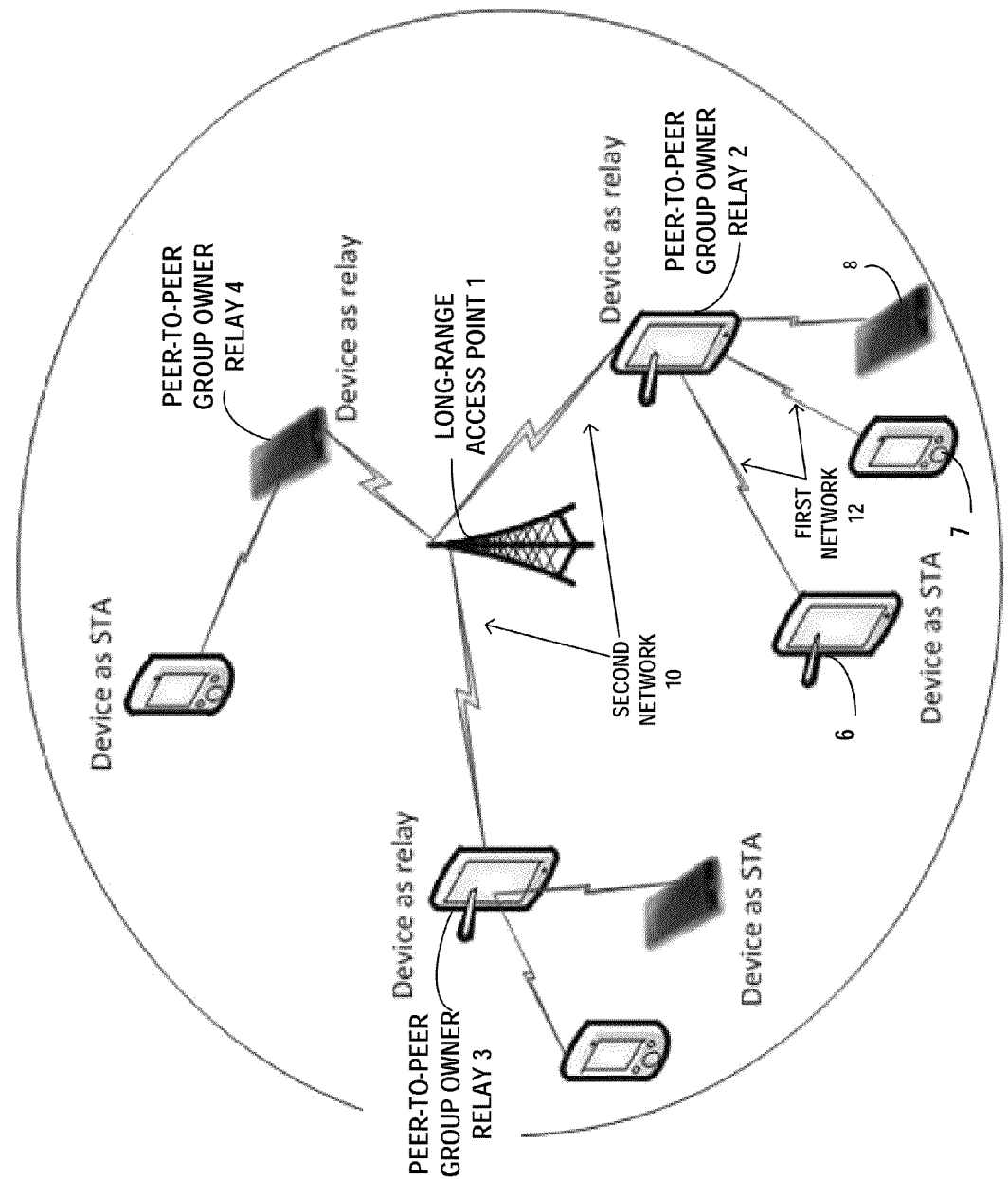
FIG. 1 is an example relay-assisted Wi-Fi, long range network, where the wireless relay device aggregates data received from STAs in a short range network and it transmits uplink traffic over the long range network to the centrally located access point, according to an example embodiment of the invention.

This section is organized into the following topics:
A. WLAN Communication Technology
B. RELAY OPERATION IN WI-FI NETWORKS
A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11ah WLAN standard is being developed for operation below 1 GHz and will have a greater range and lower obstruction losses due to its longer wavelength.

According to an example embodiment, an IEEE 802.11 WLAN may be organized as an independent basic service set (IBSS) or an infrastructure basic service set (BSS). The access point (AP) in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point (AP) in an Infrastructure BSS may bridge traffic out of the BSS onto a distribution network. STAs that are members of the BSS may exchange packets with the AP.

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

According to an example embodiment, an IEEE 802.11 WLAN may also be organized as an independent basic service set (IBSS). Wireless devices in an independent basic service set (IBSS) communicate directly with one another and there is no access point in the IBSS. WLAN ad hoc networks have an independent configuration where the terminal devices communicate directly with one another, without support from a fixed access point. WLAN ad hoc networks support distributed activities similar those of the BLUETOOTH™ protocol piconets. The IEEE 802.11 standard provides wireless devices with service inquiry features similar to the BLUETOOTH™ protocol inquiry and scanning features.

The independent basic service set (IBSS) has a BSS Identifier (BSSID) that is a unique identifier for the particular ad hoc network. Its format may be identical to that of an IEEE 48-bit address. In an ad hoc network, the BSSID may be a locally administered, individual address that is generated randomly by the device that starts the ad hoc network.

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the terminal device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TGTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the terminal device. There may be no indication to the outside world that a device has joined a particular ad hoc network. Joining an ad hoc network may require that all of the terminal device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the terminal device has joined the ad hoc network and is ready to begin communicating with the devices in the ad hoc network.

A terminal device may associate or register with an access point to gain access to the network managed by the access point. Association allows the access point to record each terminal device in its network so that frames may be properly delivered. After the terminal device authenticates to the access point, it sends an association request to the access point. Association allows the access point to record each terminal device so that frames may be properly delivered. The association request is a management frame that contains information describing the terminal device, such as its capability, listening interval, SSID, supported rates, power capability, QoS capability, and the like. The access point processes the association request and grants association by replying with an association response frame. The association response frame is a management frame that contains information describing the access point, such as its capability and supported rates. The association response frame also includes an association ID (AID) that is assigned by the access point to identify the terminal device for delivery of buffered frames. The AID field is a value assigned by the access point during association, which represents the 16-bit ID of a terminal device. The length of the AID field is two octets, the value assigned as the AID is in the range 1-2007, and it is placed in the 14 lowest significant bits (LSBs) of the AID field, with the two most significant bits (MSBs) of the AID field each set to "1".

An access point may maintain a polling list for use in selecting terminal devices in its network, which are eligible to receive contention free polls (CF-Polls) during contention free periods. The polling list is used to force the polling of contention free terminal devices capable of being polled, whether or not the access point has pending traffic to transmit to those terminal devices.

Whenever an access point needs to poll a group of terminal devices who already know their respective AIDs within the network that the access point manages, a contention free (CF) group poll message may be sent by the access point, having the following frame structure shown in Table 1:

TABLE 1

| | | CF Group Poll frame structure | | |
|---|---|---|---|---|
| Information element | Frame Control | DA | TA | BSSID |
| | | Destination Address (BC/MC) | MAC ID of AP | BSSID of network |
| Bits (octs) | 32 (4) | 48 (6) | 48 (6) | 48 (6) |
| Information element | Number Groups | Group ID | Transmit power of AP | Target power for ACK |
| Bits | Number of groups polled by this probe (N) 3 | ID of group polled N × 8 (N) | Transmit power class of AP 4 | Target power for ACK messages 4 |
| Information element | Next probe for group | Next L probes | CRC | |
| Bits | Group will be polled again in K intervals Nx8 (N) | ID of group polled in next L intervals 8 + N × L × 8 (1 + N*L) | Cyclic redundancy check 32 (4) | |

After receiving contention free (CF) group poll message from the access point, a terminal device in the group that has data to send, transmits a response message or acknowledgement (ACK) to access point, after waiting for a short interframe space (SIFS) interval.

The access point (AP) in an infrastructure BSS assists those mobile wireless devices (STAs) attempting to save power. The legacy IEEE 802.11e Wireless LAN standards provides for support of low power operation in handheld and battery operated STAs, called automatic power save delivery (APSD). A STA capable of APSD and currently in the power saving mode, will wake up at predetermined beacons received from the AP to listen to a Traffic Indication Map (TIM). If existence of buffered traffic waiting to be sent to the STA is signaled through the TIM, the STA will remain awake until AP sends out all the data. The STA does not need to send a polling signal to the AP to retrieve data, which is the reason for the term "automatic" in the acronym APSD.

A Traffic Indication Map (TIM) is a field transmitted in beacon frames, used to inform associated wireless terminal devices or STAs that the access point has buffered data waiting to be transmitted to them. Access points buffer frames of data for STAs while they are sleeping in a low-power state. The access point transmits beacons at a regular interval, the target beacon transmission time (TBTT). The Traffic Indication Map (TIM) information element in the periodically transmitted beacon frame, indicates which STAs have buffered data waiting to be accessed in the access point. Each frame of buffered data is identified by an association identifier (AID) associated with a specific STAs. The AID is used to logically identify the STAs to which buffered frames of data are to be delivered. The traffic indication map (TIM) contains a bitmap, with each bit relating to a specific association identifier (AID). When data is buffered in the access point for a particular association identifier (AID), the bit is "1". If no data is buffered, the bit for the association identifier (AID) is "0". Wireless terminal devices must wake up and listen for the periodic beacon frames to receive the Traffic Indication Map (TIM). By examining the TIM, a STAs may determine if the access point has buffered data waiting for it. To retrieve the buffered data, the STAs may use a power-save poll (PS-Poll) frame. After transmitting the PS-Poll frame, the client mobile station may stay awake until it receives the buffered data or until the bit for its association identifier (AID) in the Traffic Indication Map (TIM) is no longer set to "1", indicating that the access point has discarded the buffered data.

Two variations of the APSD feature are unscheduled automatic power save delivery (U-APSD) and scheduled automatic power save delivery (S-APSD). In U-APSD, the access point (AP) is always awake and hence a mobile wireless device (STA) in the power save mode may send a trigger frame to the AP when the STA wakes up, to retrieve any queued data at the AP. In S-APSD, the AP assigns a schedule to a STA and the STA wakes up, sends a power save poll packet to the AP in order to retrieve from the AP any data queued. An AP may maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

The IEEE 802.11ah WLAN standard operating below 1 GHz, has a greater range and lower obstruction losses due to its longer wavelength. IEEE 802.11ah provides wireless LAN operation in the sub-1 GHz range considered appropriate for sensor networks, machine-to-machine, cellular offload, and smart grid applications. IEEE 802.11ah defines three use case categories:

Use Case 1: Sensors and meters;
Use Case 2: Backhaul sensor and meter data; and
Use Case 3: Extended range Wi-Fi A principal application of IEEE 802.11ah is sensor networks, for example in smart metering, where the measurement information at each sensor node may be transmitted to an access point. In example sensor applications, the data packet size may be a few hundred bytes, the sensors may have a low duty-cycle, transmitting data every few minutes, and the number of sensor devices may be as large as 6000 devices communicating with an access point.

The IEEE 802.11ah WLAN standard organizes the STAs associated to a network, into groups. The association response frame transmitted by the access point device, indicates the group ID, along with the conventional association ID (AID) field that associates the STA to the access point. The group IDs may be numbered in descending order of group priority for quality of service (QoS) STAs. The access point may base its group ID number for the case of non-QoS STAs on their respective association times. In this manner, the access point may determine which STAs are members of which group. Based on the association request frame from a new requesting STA, the access point either uses QoS parameters or non-QoS parameters, such as proximity, to decide to which group the new STA is a member. The corresponding group ID of the group to which the new STA is assigned is then sent by the access point to the STA in response to the association request message. The association response frame indicates the group ID, along with the conventional AID field that associates the STA to the access point.

The IEEE 802.11ah WLAN standard includes Synchronized Distributed Coordination Function (DCF) uplink channel access by STAs. The association response frame transmitted by the access point, defines a restricted access period, referred to as a restricted access window (RAW). Each restricted access window comprises multiple time slots and each time slot is allocated to STAs paged in the traffic indication map (TIM). Uplink data transmissions, such as PS-polling operations, may be facilitated by transmitting the packet in a time slot in an uplink restricted access window. Downlink data transmission may be facilitated by the transmission of data packets in a downlink restricted access window. An example procedure for uplink channel access may include:

An awakened STA that decodes the beacon, sends a PS-Poll packet when its traffic indication map (TIM) bit is set to one;
The STA may determine its channel time slot in an uplink restricted access window based on its AID bit position in the traffic indication map (TIM);
The STA may contend for access to the time slot with other STAs in the same group;
After resolving PS-Polls from STAs, the access point broadcasts a downlink allocation packet that is positioned after the uplink restricted access window and before the downlink restricted access window, which includes a Block ACK, the duration of downlink restricted access window, and/or allocated downlink time slot for the STAs.

The access point includes in its transmitted beacon frame, a Grouping Parameter Set information element to informs the STAs within a group of [1] the interval they may sleep before they may contend for the medium and [2] their medium access duration. The Grouping Parameter Set element may include: [1] the group ID; [2] a prohibition interval; and [3] a group interval end time. The group interval end time, as the name implies, specifies the instant following the start of the beacon, at which the uplink restricted access window terminates, which applies to all STAs in the relevant group. The prohibition interval specifies the interval from the group's end time to its next start time at which members of the group are allowed to contend for the radio medium. The Grouping Parameter Set information element in the beacon frame enables the access point to place a given STA in one group in one beacon frame and move that STA to another group in the next consecutive beacon frame.

Wi-Fi DIRECT™ protocol—Software Access Points

The Wi-Fi Alliance has developed a Wi-Fi Peer-to-Peer technology named Wi-Fi DIRECT™ protocol™ that is specified in the Wi-Fi Alliance Peer-to-Peer Specification, October 2010(incorporated herein by reference). Wi-Fi DIRECT™ protocol, is also referred to herein as Peer-to-Peer or P2P. Wi-Fi DIRECT™ protocol enables IEEE 802.11a, g, or n devices to connect to one another, peer-to-peer, without prior setup or the need for wireless access points. Wi-Fi DIRECT™ protocol embeds a software access point into any device, which provides a version of Wi-Fi Protected Setup. When a device enters the range of a STA supporting Wi-Fi DIRECT™ protocol (a Wi-Fi DIRECT™ protocol device), it can connect to it and then gather setup information using a Wi-Fi Protected Setup transfer. Devices that support Wi-Fi DIRECT™ protocol may discover one another and advertise available services. Wi-Fi DIRECT™ protocol devices support typical Wi-Fi ranges and the same data rates as can be achieved with an 802.11a, g, or n infrastructure connection. When a device enters the range of the Wi-Fi DIRECT™ protocol device, it may connect to it using the existing protocol, and then gather setup information using a Wi-Fi Protected Setup 2.0 transfer.

Wi-Fi DIRECT™ protocol enables IEEE 802.11devices that support Wi-Fi DIRECT™ protocol, to connect to one another, point-to-point, without joining a network. The specification may be implemented in any Wi-Fi device. Devices that support the specification will be able to discover one another and advertise available services. Wi-Fi DIRECT™ protocol devices will support typical Wi-Fi ranges and the same data rates as can be achieved with an infrastructure connection. Wi-Fi DIRECT™ protocol provides point-to-point connections for networks by embedding a software access point into any device that wishes to support Wi-Fi DIRECT™ protocol. The soft AP provides a version of Wi-Fi Protected Setup 1.0 by entering a PIN or pressing a button. When a device enters the range of the Wi-Fi DIRECT™ protocol device, it may connect to it using the existing protocol, and then gather setup information using a Wi-Fi Protected Setup 1.0 transfer.

Wi-Fi DIRECT™ protocol-certified devices may create direct connections between Wi-Fi client devices without requiring the presence of a traditional Wi-Fi infrastructure network of an access point or router. Wi-Fi DIRECT™ protocol-certified devices support connection with existing legacy Wi-Fi devices using the IEEE 802.11a/g/n protocols. Wi-Fi DIRECT™ protocol Device Discovery and Service Discovery features allow users to identify available devices and services before establishing a connection, for example, discovering which Wi-Fi networks have a printer. Wi-Fi DIRECT™ protocol devices may use Wi-Fi Protected Setup to create connections between devices.

A Wi-Fi DIRECT™ protocol device is capable of a peer-to-peer connection and may support either an infrastructure network of an access point or router or a peer-to-peer (P2P) connection. Wi-Fi DIRECT™ protocol devices may join infrastructure networks as stations (STAs) and may support Wi-Fi Protected Setup enrollee functionality. Wi-Fi DIRECT™ protocol devices may connect by forming Groups in a one-to-one or one-to-many topology. The Groups functions in a manner similar to an infrastructure basic service set (BSS). A single Wi-Fi DIRECT™ protocol device will be the Group Owner (GO) that manages the Group, including controlling which devices are allowed to join and when the Group is started or terminated. The Group Owner (GO) will appear as an access point to legacy client's devices.

Wi-Fi DIRECT™ protocol devices include a Wi-Fi Protected Setup Internal Registrar functionality and communication between Clients in the Group. Wi-Fi DIRECT™ protocol devices may be a Group Owner (GO) of a Group and may be able to negotiate which device Adopts this role when forming a Group with another Wi-Fi DIRECT™ protocol device. A Group may include both Wi-Fi DIRECT™ protocol devices and legacy devices (i.e., that are not compliant with the Wi-Fi Alliance Peer-to-Peer Specification). Legacy Devices can only function as Clients within a Group.

Wi-Fi DIRECT™ protocol devices may support Discovery mechanisms. Device Discovery is used to identify other Wi-Fi DIRECT™ protocol devices and establish a connection by using a scan similar to that used to discover infrastructure access points. If the target is not already part of a Group, a new Group may be formed. If the target is already part of a Group, the searching Wi-Fi DIRECT™ protocol device may attempt to join the existing Group. Wi-Fi Protected Setup may be used to obtain credentials from the Group Owner (GO) and authenticate the searching Wi-Fi DIRECT™ protocol device. Wi-Fi DIRECT™ protocol devices may include Service Discovery that enables the advertisement of services supported by higher layer applications to other Wi-Fi DIRECT™ protocol devices. Service Discovery may be performed at any time (e.g. even before a connection is formed) with any other discovered Wi-Fi DIRECT™ protocol device.

A Group may be created by a single Wi-Fi DIRECT™ protocol device, such as when connecting a legacy device. When forming a connection between two Wi-Fi DIRECT™ protocol devices, a Group may be formed automatically and the devices may negotiate to determine which device is the Group Owner. The Group Owner may decide if this is a temporary (single instance) or persistent (multiple, recurring use) Group. After a Group is formed, a Wi-Fi DIRECT™ protocol device may invite another Wi-Fi DIRECT™ protocol device to join the Group. The decision of whether or not to accept an invitation may be left to the invited Wi-Fi DIRECT™ protocol device.

Concurrent Wi-Fi DIRECT™ protocol Devices may participate in multiple Groups, simultaneously, each group requires own Wi-Fi stack. A Wi-Fi DIRECT™ protocol Device that may be in a Group while maintaining a WLAN infrastructure connection at the same time is considered a Concurrent Device or a dual stack device. For example, a laptop connected directly to a printer while simultaneously using a WLAN connection is operating as a Concurrent Device. Concurrent connections may be supported by a single radio and may support connections on different channels. Concurrent operation may be supported by multiple protocol stacks, for example, one for operation as a WLAN-STA and one for operating as a Wi-Fi DIRECT™ protocol device. For example, two separate physical MAC entities may be maintained, each associated with its own PHY entity, or they may use a single PHY entity supporting two virtual MAC entities.

The Wi-Fi Peer-to-Peer Technical Specification v 1.1, 2010published by the Wi-Fi Alliance, provides for provisioning in Wi-Fi DIRECT™ protocol networks. Provisioning is a phase of peer-to-peer group formation in which credentials for the peer-to-peer group are exchanged based on the use of Wi-Fi Simple Configuration. Credentials are information that is required to join a peer-to-peer group as defined in the Wi-Fi Simple Configuration Specification.

To allow for peer-to-peer device configuration, peer-to-peer devices may delay starting the provisioning phase until the expiration of the larger of the peer-to-peer group owner's (GO) configuration time and the peer-to-peer client's client configuration time, based on respective configuration timeout attributes exchanged during a preceding group owner negotiation.

The peer-to-peer device selected as peer-to-peer group owner (GO) during group owner negotiation may start a peer-to-peer group session using the credentials it intends to use for that group. The peer-to-peer group owner (GO) may use the operating channel indicated during group owner negotiation, if available. The peer-to-peer client may connect to the peer-to-peer group owner to obtain credentials. If the operating channel is not available the peer-to-peer group owner may use another channel from a channel list attribute sent in the group owner negotiation confirmation frame. The peer-to-peer client may have to scan to find the peer-to-peer group owner if the intended operating channel is not available. A group formation bit in a peer-to-peer group capability bitmap of the peer-to-peer capability attribute may be set to one until provisioning succeeds.

Provisioning may be executed in Wi-Fi DIRECT™ protocol networks, as described, for example, in the Wi-Fi Simple Configuration (WSC) Specification, Version 2.0, Dec. 20, 2010. The peer-to-peer group owner (GO) may serve the role as the access point with an internal registrar. It will only allow association by the peer-to-peer device that it is currently with in a group formation. Since the user has entered the WSC PIN or triggered the WSC pushbutton functionality on both devices, the registrar may send an M2 message in response to an M1 message. The peer-to-peer client may serve the role as the STA enrollee. It may associate to the peer-to-peer device that it is currently with in the group formation.

If provisioning fails, then group formation ends and the peer-to-peer group owner (GO) may end the peer-to-peer group session. If provisioning fails, the peer-to-peer device may retry group formation or return to device discovery. On successful completion of provisioning in Wi-Fi DIRECT™ protocol networks, the peer-to-peer group owner (GO) may set the group formation bit in the peer-to-peer group capability bitmap of the peer-to-peer capability attribute to zero. At this point the peer-to-peer client may join the peer-to-peer group in the Wi-Fi DIRECT™ protocol network, using the credentials supplied during provisioning.

B. Relay Operation in Wi-Fi Networks

In sensor networks and smart grid applications, large numbers of wireless terminals or STAs, both fixed and mobile, arrayed over kilometer-sized areas, will need to communicate with a long range access point device. In the case of IEEE 802.11ah networks, it is envisioned to have a Wi-Fi network of 6000 wireless terminal devices or STAs being served by a long range access point. The STAs may operate on battery power and must conserve their power during long periods of inactivity punctuated by short durations of communication sessions.

FIG. 1 is an example relay-assisted second network, for example the long range network 10, where the wireless relay device 2 aggregates data received from STAs 6, 7, and 8 in a first network, for example the short range network 12 and it transmits uplink traffic over the long range network 10 to the centrally located access point 1, according to an example embodiment of the invention.

In an example embodiment of the invention, the long range Wi-Fi network 10 is an IEEE 802.11ah WLAN that may be applied as a low data rate meter network, e.g., a smart meter pooling data from gas and water meters from various apartments. The STAs 6, 7, and 8 are typically wireless sensors that are battery operated and hence power constrained. The wireless relay device 2 enables data aggregation from received uplink traffic from multiple wireless sensors 6, 7, and 8. The wireless relay device 2 may also assist in short range communication over network 12 among sensors 6, 7, and 8, avoiding long range communication over the network 10 between a sensor 6 and the distantly located access point 1. Such a relay-assisted Wi-Fi network 10 is depicted in FIG. 1, according to an example embodiment of the invention. The access point 1 may also communicate over the long range network 10 with other wireless relay devices 3 and 4.

Figure 2:
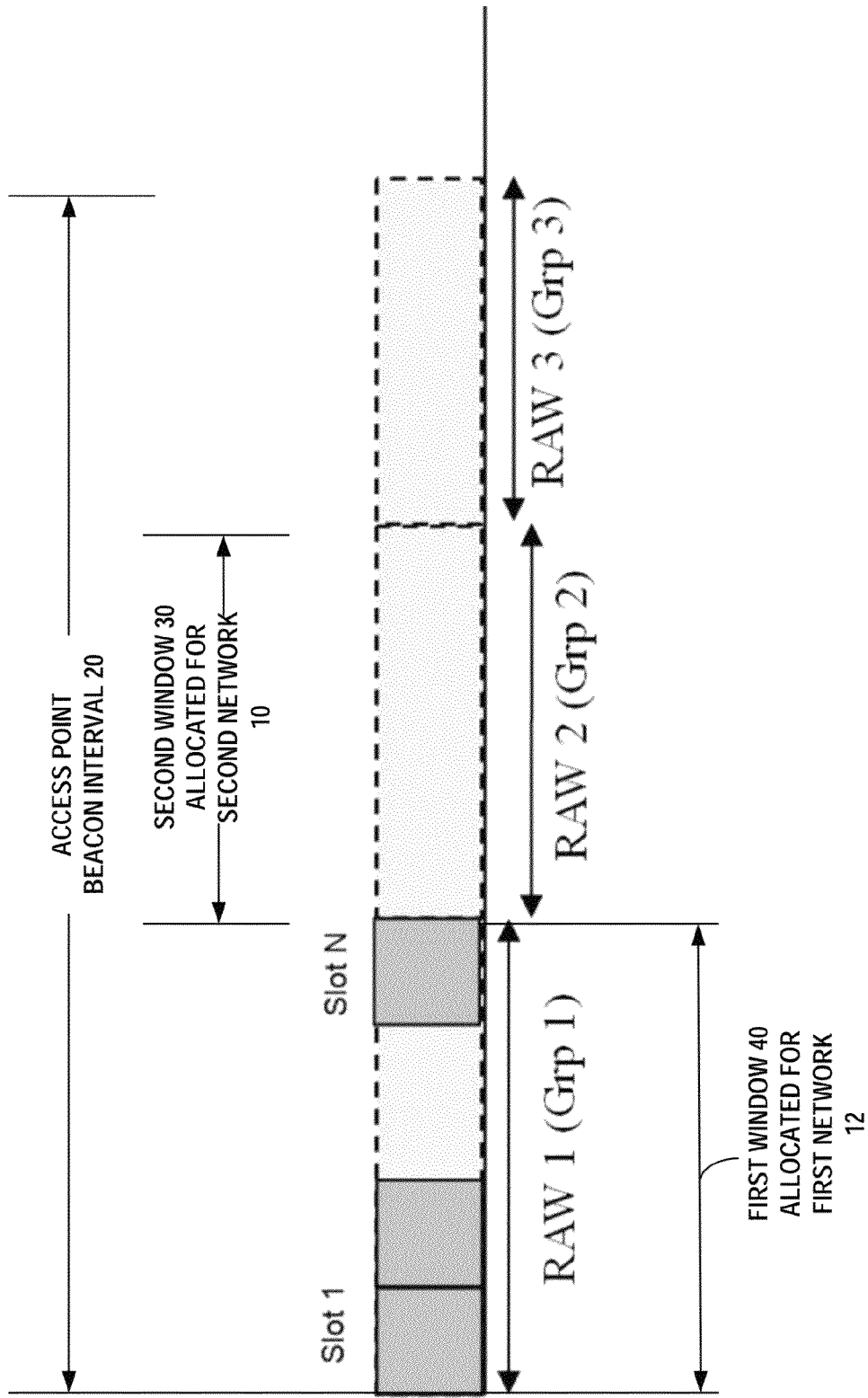
FIG. 2 shows an IEEE 802.11ah association response frame defined by the access point, which defines a restricted access period, referred to as a restricted access window (RAW), for uplink channel access by wireless relay devices on behalf of the STAs they serve, within an access point beacon interval, in accordance with an example embodiment of the invention.

In accordance with an example embodiment of the invention, FIG. 2 shows an IEEE 802.11ah association response frame that defines a sequence of restricted access periods, referred to as a restricted access window (RAW), in a beacon interval 20 of the access point 1. A first window 40 in the association response frame, is a RAW allocated for one or more time slots for uplink channel access by client STAs in the first network, for example the short range network 12 peer-to-peer (P2P) group, for example STAs 6, 7, and 8, to access a wireless relay device, such as wireless relay device 2 serving as the P2P group owner. A second window 30 in the association response frame, is a RAW allocated for one or more time slots for uplink channel access by a wireless relay device, for example wireless relay device 2, accessing the access point 1 over a second network, for example the long range 802.11ah WLAN network 10. In accordance with an example embodiment of the invention, the wireless relay device 2 relays uplink data it receives in a first window 40 over the short range network 12 from the client devices 6, 7, and 8 in the peer-to-peer (P2P) group, relaying it in a second window 30 over the long range 802.11ah network 10 to the access point 1.

In an example embodiment of the invention, the wireless relay device 2 determines the first time window 40 allocated for the short range network 12, allowing first maximum transmit power for packet transmissions. The wireless relay device 3 determines the second time window 30 allocated for the long range network 10. The second time window 30 is allowed for transmissions also within the short range network 12, but only with second maximum transmit power that is lower than the first maximum transmit power. In this manner, interference by the transmissions in the short range network 12 during the second time window 30, will be minimized with respect to transmissions in the long range network 10. The short range network 12 may be a peer-to-peer group, and the wireless relay device 2 may be a peer-to-peer group owner that serves as a relay between the long range network 10 and the peer-to-peer group owner and the STAs that it serves. The first time window may be determined by the wireless relay device sending a request to the access point and receiving a response or by receiving a beacon from the access point, specifying the first time window.

In an example embodiment of the invention, the first network 12 is a relay sub-network that may include a variety of sensor type networks and/or other networks having a large number of supported stations/apparatuses. Examples of such networks include, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Wireless Access (BWA) (LMDS, WiMAX, AIDAAS and HiperMAN), or the like networks, as well as shorter range networks such as Wi-Fi Direct peer-to-peer (P2P) group, Bluetooth, Zigbee, IEEE 802.11, Digital Enhanced Cordless Telecommunications (DECT), HiperLAN, Radio Frequency Identification (RFID), Wireless USB, DSRC (Dedicated Short range Communications), Near Field Communication, wireless sensor networks, EnOcean; TransferJet, Ultra-wideband (UWB from WiMedia Alliance), WLAN, WiFi, and HiperLAN.

Figure 3:
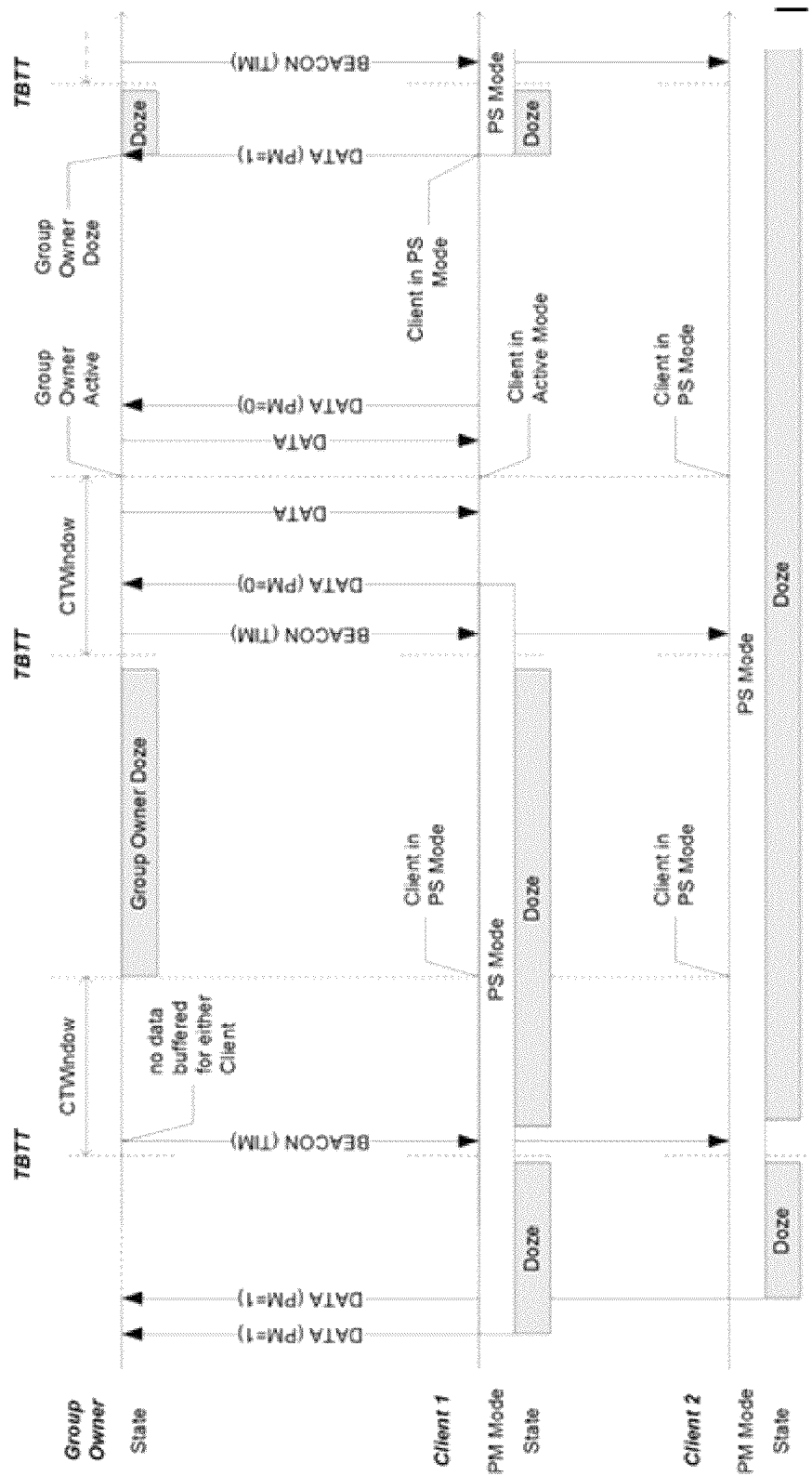
FIG. 3 is an example Opportunistic power save mechanism in a P2P group with CTWindow intervals for data exchange between the P2P group owner and P2P clients, according to an example embodiment of the invention.

FIG. 3 is an example Opportunistic power save mechanism in a P2P group with CTWindow intervals for data exchange between the P2P group owner and P2P clients, according to an example embodiment of the invention. A P2P group comprises a P2P group owner and multiple P2P clients. Opportunistic power save (OPS) mechanism is defined in a P2P group. In the OPS method, a P2P group owner wakes up in predefined intervals termed as Client Traffic Windows (CTWindows) as depicted in FIG. 3. The CTWindows initiate immediately after the beacon transmission, where this beacon is transmitted by the P2P group owner and not the centrally-located AP. The CTWindow intervals and durations are known to P2P clients. Based on the information about buffered data indicated in TIM bitmap, STAs wake up within the CTWindow interval to receive downlink traffic and also transmit uplink data to the P2P group owner. On completion of uplink and downlink data exchange, the clients go back to doze state with PM (power management) bit set to 1. The STAs wake up at next beacon (from the P2P group owner) to check buffered data status and either wake up or go back to doze state immediately.

Figure 4:
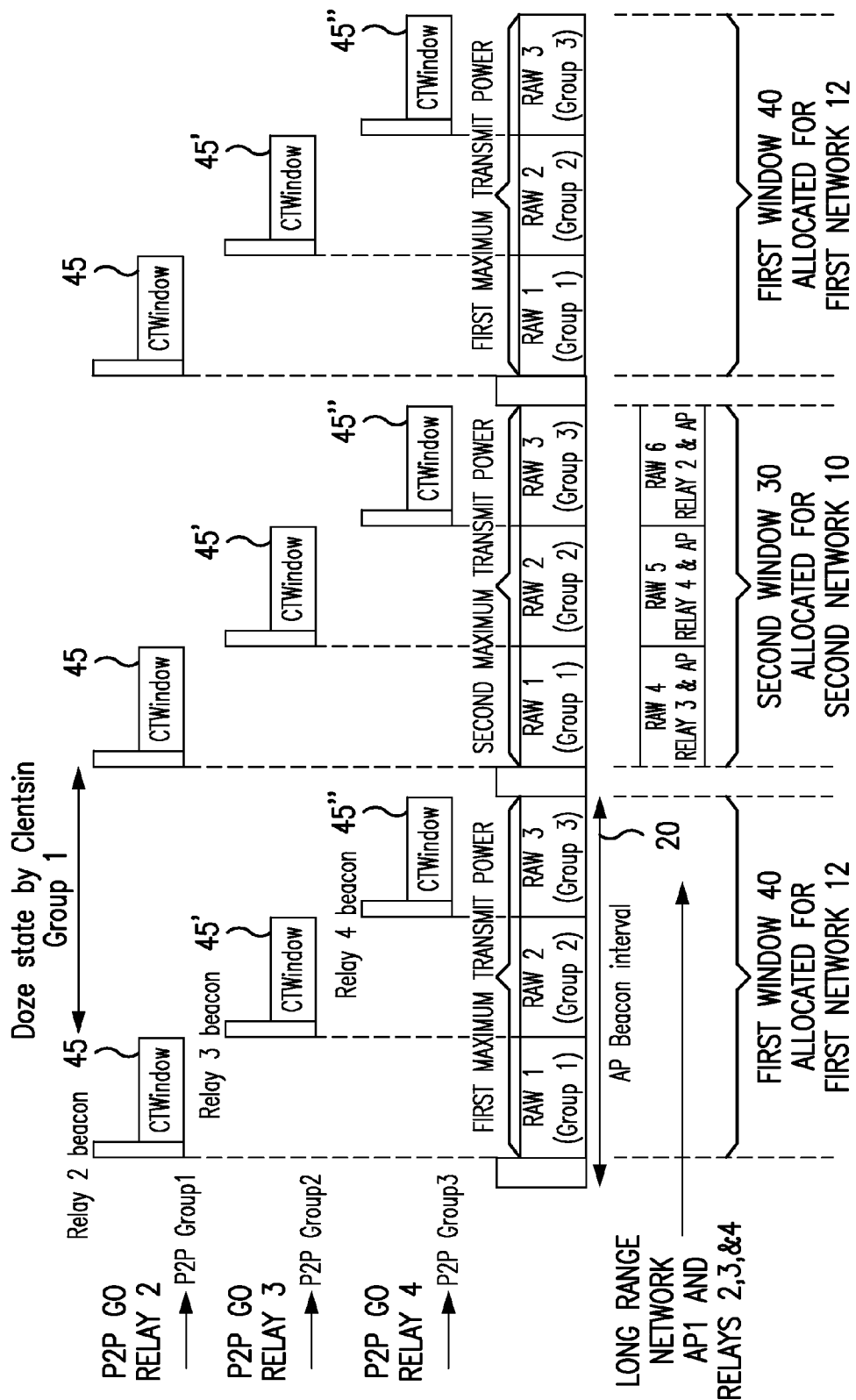
FIG. 4 is an example Mapping CTwindow of a P2P group owner, the wireless relay device, with a RAW interval, according to an example embodiment of the invention.

FIG. 4 is an example Mapping CTwindow 45 of a P2P group owner, the wireless relay device 2, with a RAW interval (first window 40), according to an example embodiment of the invention. In accordance with an embodiment of the invention, the P2P group owner, the wireless relay device 2, acts as a relay device in IEEE 802.11ah, where it communicates concurrently with P2P clients, STAs 6, 7, and 8, in a P2P group over the first network, for example the short range network 12 and also with the WLAN access point 1 over the second network, for example the long range network 10. This concurrent operation may be characterized as receiving/transmitting uplink and downlink data from P2P clients, STAs 6, 7, and 8, followed by the P2P group owner, the wireless relay device 2, relaying them to the Wi-Fi access point 1, and vice versa. This relay operation by the P2P group owner, the wireless relay device 2, may be achieved by using one MAC entity when uplink/downlink data is received/transmitted from P2P clients 6, 7, and 8 in one time slot, CTwindow 45 in the first window 40 over short range network 12, and by using another MAC entity for transmitting uplink data to the access point 1 in another time slot, the second window 30 over long range network 10. Wi-Fi direct may be used for the MAC in P2P group operations for relaying data in the short range network 12.

In accordance with an example embodiment of the invention, the CTWindows 45, 45', and 45" for the P2P group owner wireless relay devices 2, 3, and 4, are mapped in an opportunistic power save operation onto a RAW (first window 40), defined by the WLAN access point 1. The WLAN AP 1 needs to be aware of the relay function of the P2P owner 2. For example, the AP 1 assigns a periodic RAW (first window 40) to a P2P owner, the wireless relay device 2, (or multiple P2P owners 2, 3, and 4). The P2P owner can use all or a subset of the periodic RAW (first window 40) for periodic beacon transmissions followed by CTWindow 45 to communicate with the P2P group clients 6, 7, and 8. In addition the WLAN AP 1 can assign another RAW to a group of STAs including the P2P owner. Since the P2P owner is typically a more capable device than the STA connecting to the P2P owner, this will satisfy the communication requirements of the P2P owner. Typically the P2P owner may, for example, fuse the uplink data received from numerous sensors 6, 7, and 8 and it will have additional functionality compared to a sensor STA. The additional functionality, together with the need to relay the traffic of multiple sensors, may require additional RAWs.

In an example embodiment of the invention, the wireless relay device 3 determines the first time window 40 allocated for the short range network 12, allowing first maximum transmit power for packet transmissions, as shown for the first window 40 on the left side and on the right side of the timing diagram of FIG. 4. The wireless relay device 3 determines the second time window 30 allocated for the long range network 10. The second time window 30 is allowed for transmissions also within the short range network 12, but only with second maximum transmit power that is lower than the first maximum transmit power, as shown for the second window 30 in the middle of the timing diagram of FIG. 4. In this manner, interference by the transmissions in the short range network 12 during the second time window 30, will be minimized with respect to transmissions in the long range network 10.

The P2P group owner 2 may use the RAW (second window 30) for information exchange during association with the AP 1 and the AP may use this information to schedule appropriate RAWs.

Mapping RAWs (first windows 40) with CTWindows 45.

Figure 5:
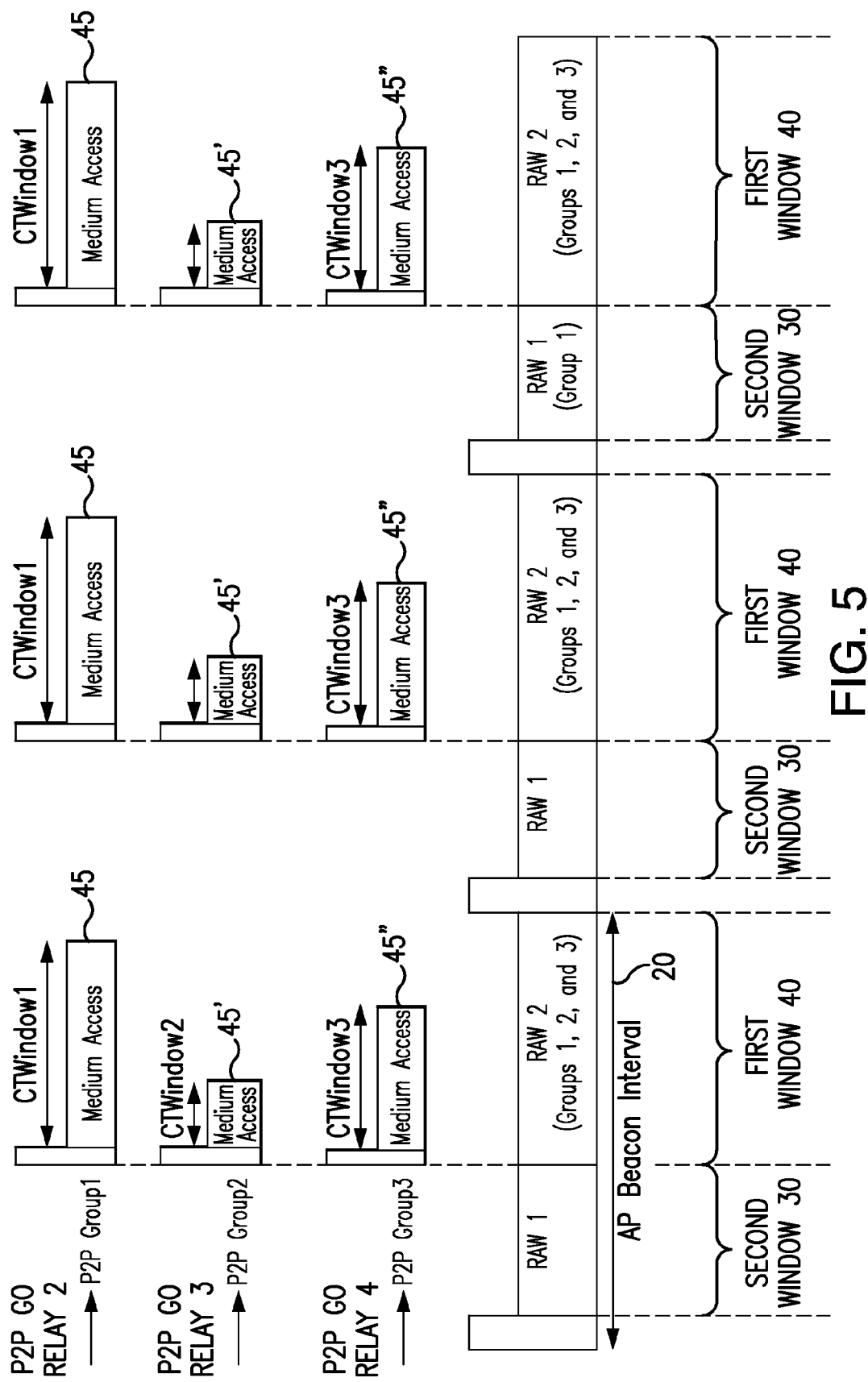
FIG. 5 is an example Mapping CTwindows of three P2P groups within one RAW interval, according to an example embodiment of the invention.

The mapping of CTWindow 45 parameters from multiple P2P groups to RAW-based channel access, either using different RAWs (first windows 40) or within a single RAW (first window 40), is depicted respectively, in FIGS. 4 and 5.

FIG. 5 is an example Mapping CTwindows 45, 45', and 45" of three P2P groups, Group1, Group2, and Group3, within one RAW interval (first window 40), according to an example embodiment of the invention. CTWindow 45 parameters may include CTWindow duration and CTWindow interval. The AP 1 may assign a RAW (first window 40) to only one P2P owner 2 as in FIG. 4 or to multiple P2P owners 2, 3, and 4, as in FIG. 5.

The P2P group owner 2 may use the whole RAW (first window 40) for beacon transmission and CTWindow 45 for communication with the P2P group, as in FIG. 4. The P2P group owner 2 may also shorten the CTWindow 45 to leave channel access time protected by the RAW (first window 40) for communication with the AP 1, as depicted in FIG. 5.

In order to obtain periodicity for the P2P Group Owner's beacon transmission, the P2P owner 2 may need periodic RAW (first window 40) assigned by the AP 1. The P2P owner 2 may use all assigned RAW (first window 40) to schedule CTWindows 45 with the P2P group or it may use a subset of them. It is the P2P Group Owner that decides on the use of the RAW windows (first window 40).

The AP 1 may needs to obtain the following information during association from the P2P Group Owner 2:
Indication of P2P group owner
Request for periodic RAW to serve P2P group
  Target RAW intervals and durations that correspond to the Beacon Interval and cover at least the target CTWindow of the P2P Group Owner
Request for RAW (standard 802.11ah procedure)
  Target RAW intervals and durations corresponding to the estimated communication needs of the P2P owner if different from the Request for periodic RAW to serve P2P group.

The AP 1 may use the "Request for periodic RAW to serve P2P group" information to schedule periodic RAW (first window 40) for the P2P Group Owner 2. Since the AP 1 knows that the STA is a P2P group owner, it will not change the RAW schedule frequently. Usually, the AP 1 will schedule a full RAW (first window 40) to a single group owner 2 or it will schedule it to a set of P2P group owners 2, 3, and 4 as in FIG. 5. In the case of FIG. 5 the P2P groups will preferably be covering non-overlapping areas.

The AP 1 may schedule additional RAWs (first window 40) to the P2P owner 2 when it is acting as a regular STA. In this case the STA may be part of a larger group of STAs, including non-P2P owners. The AP 1 may change these RAWs based on traffic fluctuations and operational requirements of the STA in different RAW groups.

The AP 1 may also signal other RAW suitable for P2P group communication. For example, the AP 1 may schedule an uplink RAW to another group of STAs (does not include the P2P group owner). It may allow the P2P group owner 2 to operate the P2P group with reduced power during that RAW. The power reduction may be determined by the STA based on the estimated pathloss to the AP 1 and a target received power value at the AP 1. In this case, the AP 1 may indicate its own transmit power together with the target receive power level to the P2P group owner 2. The P2P group owner 2 may use this information to calculate the pathloss and to determine the maximum transmit power to reach the target receive power level.

Figure 6:
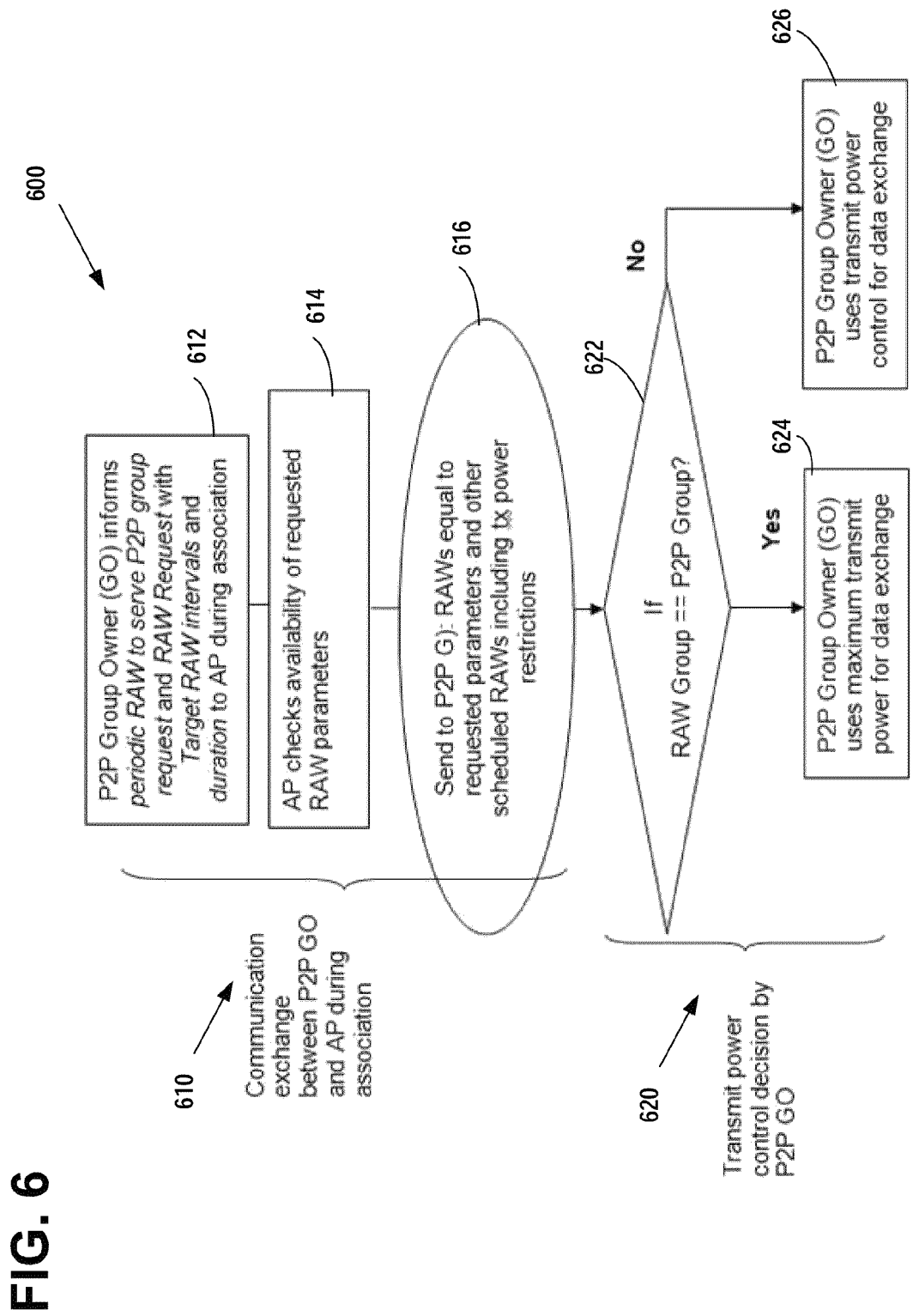
FIG. 6 illustrates an example flowchart of RAW parameter exchange between the access point and a P2P group owner, according to an example embodiment of the invention.

FIG. 6 illustrates an example flowchart 600 of RAW parameter exchange between AP 1 and a P2P group owner 2, according to an example embodiment of the invention.

The process 610 of RAW parameter exchange during association, including steps 612, 614, and 616, and usage of transmit power control in RAWs 620, including steps 622, 624, and 626, is depicted in the flowchart of FIG. 6.

Process 610: Communication exchange between P2P GO and AP during association:
   Step 612: P2P Group Owner (GO) informs periodic RAW to serve P2P group request and RAW Request with Target RAW intervals and duration to AP during association.
   Step 614: AP checks availability of requested RAW parameters.
   Step 616: Send to P2P: RAWs equal to requested parameters and other scheduled RAWs including transmit power restrictions.
   Process 620: Transmit power control decision by P2P GO:
   Step 622: If RAW Group==P2P Group?
   Step 624: YES: P2P Group Owner (GO) uses maximum transmit power for data exchange.
   Step 626: NO: P2P Group Owner (GO) uses transmit power control for data exchange.

Scheduling of CTWindows Among RAW Groups

Since the beacon intervals of the wireless relay device 2 are fixed, as well as their corresponding CTWindow durations, the AP 1 may negotiate periodic RAWs 30 for P2P group beacon transmissions and CTWindow intervals with multiple P2P group owners 2, 3, and 4 to achieve non-overlapping beacon intervals of the P2P groups. This negotiation may occur during association and it may have to be repeated, e.g. when a new P2P group is established, additional STAs join the P2P group, or the traffic load of the P2P group changes.

The P2P Group Owner 2 will follow the RAW 30 schedule and will stay synchronized to the WLAN AP 1. This will prevent beacon transmissions of P2P group owners from drifting. Multiple RAW intervals for P2P groups may be scheduled within a TBTT, as depicted in FIG. 4. The beacon interval of the P2P group may be less frequent than the beacon interval of the AP (not depicted in FIG. 4).

In cases where the P2P groups are operating in non-overlapping areas, the CTWindows may be scheduled during the same RAW 30 and multiple P2P groups may operate at the same time as, depicted in FIG. 5. In other words, CTWindow1 may overlap with CTWindow2 and CTWindow3 for P2P groups that are not causing harmful interference to each other.

More than 2 hops

If more than 2 hops is supported, a P2P group member (e.g. P2P Group 1 in FIG. 4) may be the owner of another P2P group representing the second hop. The scheduling of the CTWindows of the 2nd hop P2P groups may be coordinated with the P2P CTWindow of the first hop P2P group. More hops may be introduced following a similar logic.

FIG. 7 is an example flow diagram 700 of operational steps in the wireless relay device 2, according to an example embodiment of the invention. The steps of the flow diagram represent computer code instructions stored in the RAM and/or ROM memory of the wireless relay device 2, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 702: determining, by a wireless relay device, a first time window allocated for a first network, allowing first maximum transmit power for packet transmissions; and Step 704: determining, by the wireless relay device, a second time window allocated for a second network, wherein the second time window is allowed for transmissions also within the first network, but only with second maximum transmit power that is lower than the first maximum transmit power.

Figure 8A:
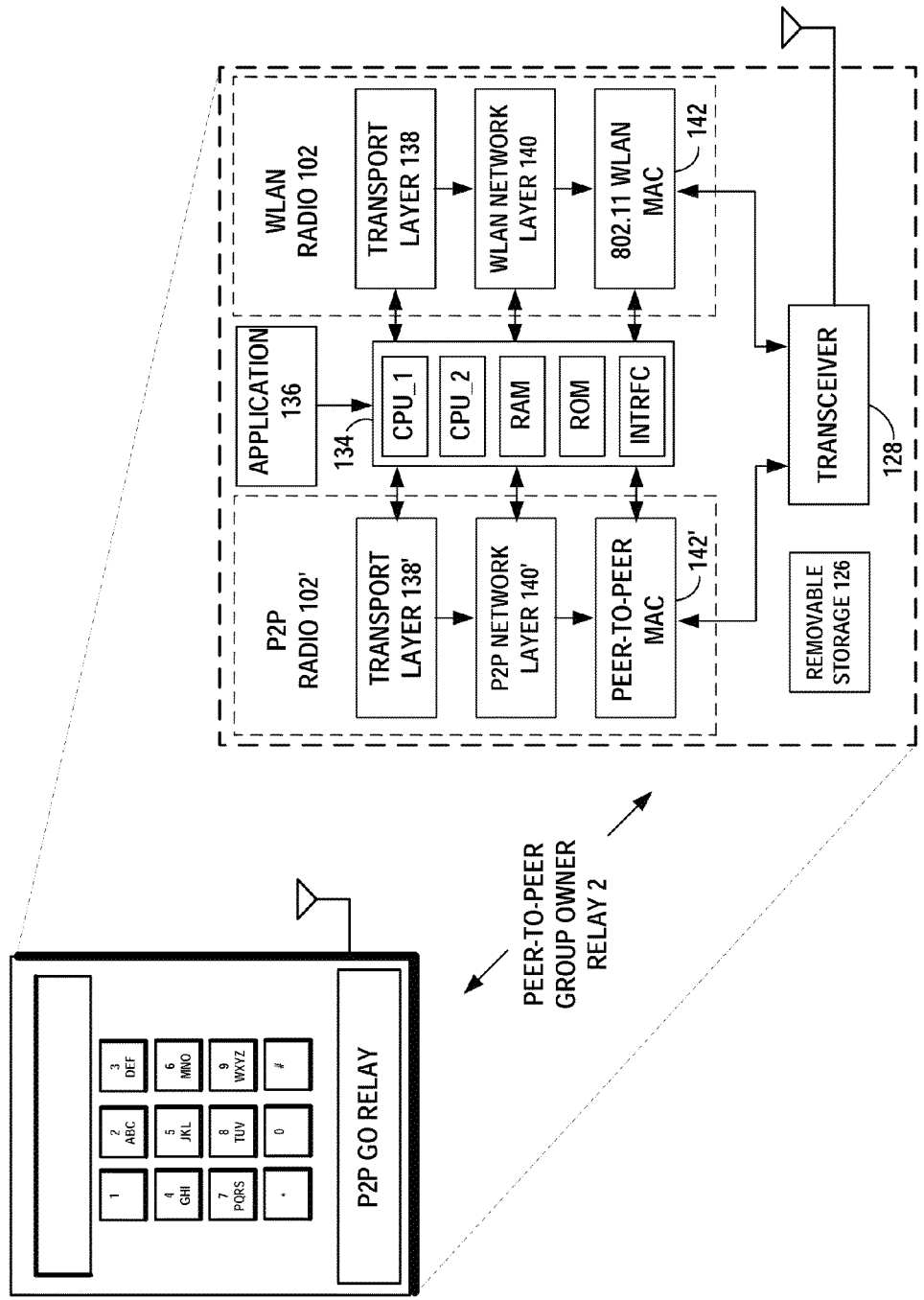
FIG. 8A is an example functional block diagram, illustrating an example peer-to-peer group owner wireless relay device, according to an example embodiment of the invention.

FIG. 8A is an example functional block diagram, illustrating an example peer-to-peer group owner wireless relay device 2, according to an example embodiment of the invention. The example peer-to-peer group owner wireless relay device 2 may include a processor 134 that may include a dual or multi-core central processing unit CPU_1 and CPU_2, a RAM memory, a ROM memory, and an interface for a keypad, display, and other input/output devices. The example peer-to-peer group owner wireless relay device 2 may include a WLAN protocol stack, including the IEEE 802.11 MAC 142, which may be based, for example, on the IEEE 802.11ah WLAN standard for communication with the AP 1 over the long range network 10. The WLAN protocol stack may also include a network layer 140, a transport layer 138, and an application program 136. In accordance with an embodiment of the invention, the example peer-to-peer group owner wireless relay device 2 may include a P2P protocol stack, including the Wi-Fi Direct peer-to-peer MAC 142' for communication over the short range network 12 with the P2P client STAs 6, 7, and 8. The P2P protocol stack may also include a network layer 140' and a transport layer 138'.

Figure 9:
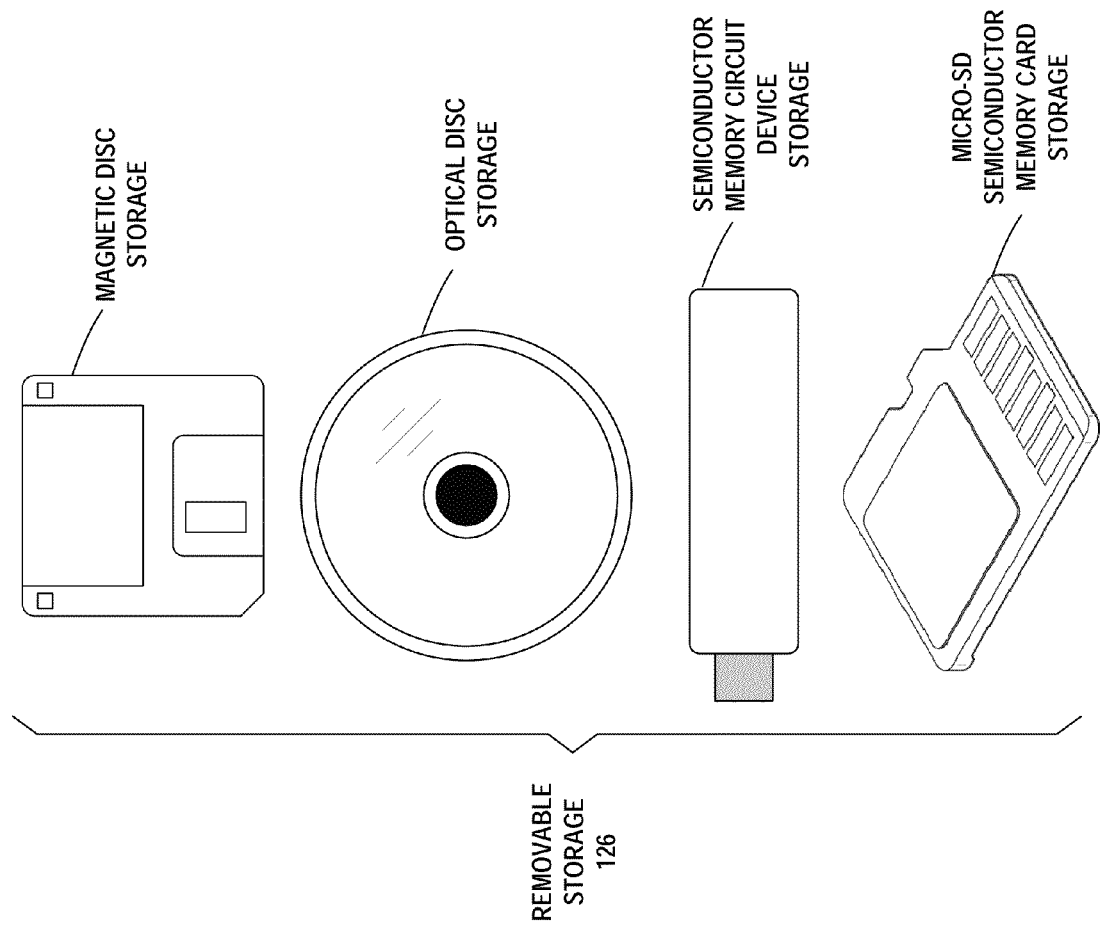
FIG. 9 illustrates an example embodiment of the invention, wherein examples of removable storage media are shown, in accordance with at least one embodiment of the present invention.

In an example embodiment, the interface circuits in FIG. 8A may interface with one or more radio transceivers, battery and other power sources, key pad, touch screen, display, microphone, speakers, ear pieces, camera or other imaging devices, etc. The RAM and ROM may be removable memory devices 126 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 9, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Figure 8B:
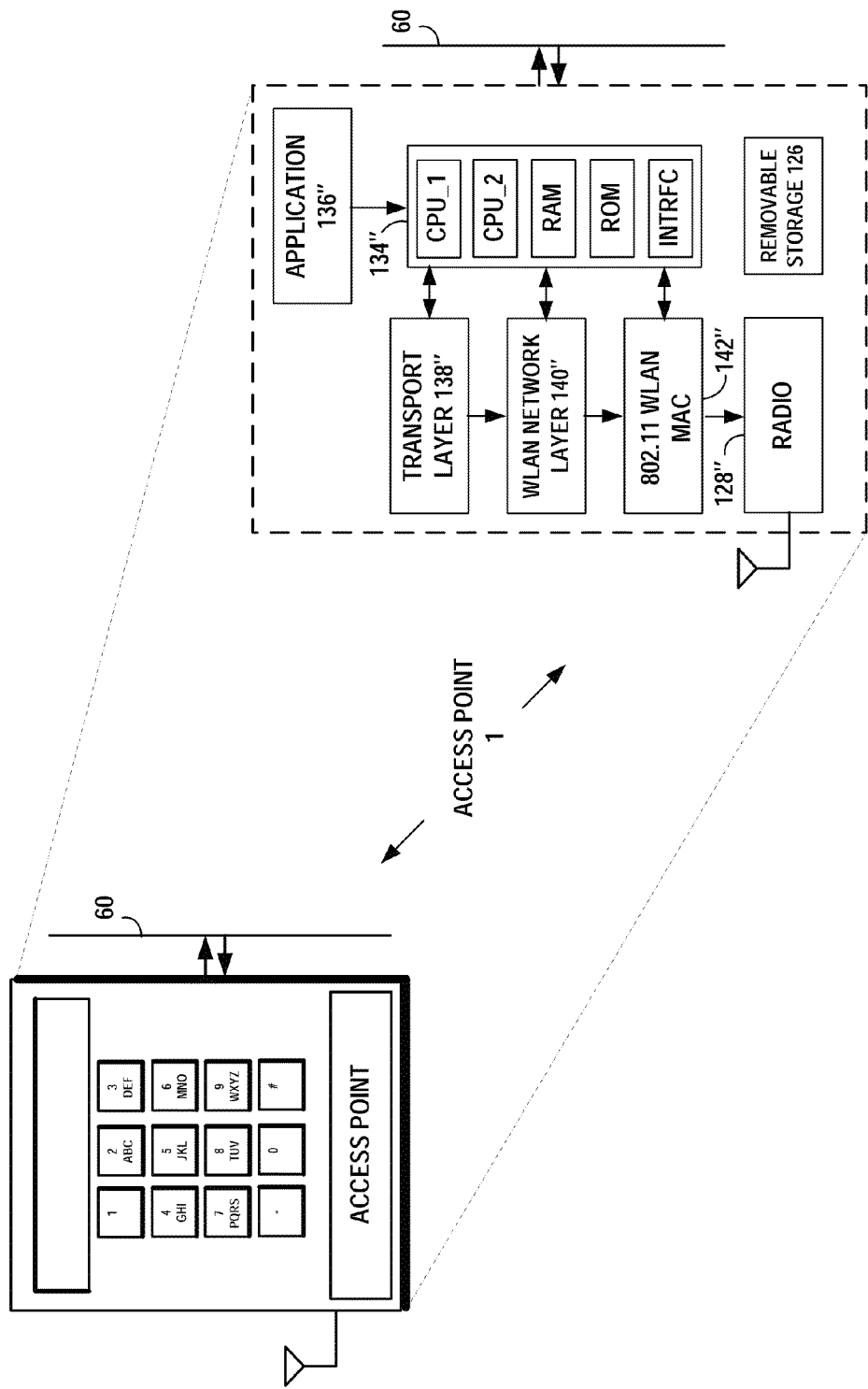
FIG. 8B is an example functional block diagram, illustrating an example long range access point device, according to an example embodiment of the invention.

FIG. 8B is an example functional block diagram, illustrating an example long range access point device 1, according to an example embodiment of the invention. The long-rang access point AP 1 may include an application for forwarding sensor data, where the measurement information received from long-rang sensor stations 6, 7, and 8 may be forwarded for further processing of the sensor data.

The example access point AP 1 may include a processor 134" that may include a dual or multi-core central processing unit CPU_1 and CPU_2, a RAM memory, a ROM memory, and an interface for a keypad, display, and other input/output devices. The example access point AP 1 may include a protocol stack, including the transceiver 128" and IEEE 802.11 ah MAC 142", which may be based, for example, on the IEEE 802.11ah WLAN standard. The protocol stack may also include a network layer 140", a transport layer 138", and an application program 136".

In an example embodiment, the interface circuits in FIG. 8B may interface with one or more radio transceivers, battery and other power sources, key pad, touch screen, display, microphone, speakers, ear pieces, camera or other imaging devices, etc. The RAM and ROM may be removable memory devices 126" such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 9, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 9 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, wireless networks may include other sensor type networks and/or other networks having a large number of supported stations/apparatuses. Examples of such networks include, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Wireless Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short range Communications), Near Field Communication, wireless sensor networks, EnOcean; TransferJet, Ultra-wideband (UWB from WiMedia Alliance), WLAN, WiFi, and HiperLAN.

In accordance with an example embodiment of the invention, the STAs may be, for example, a miniature device such as a key fob, smart card, jewelry, or the like. The STAs may be, for example, a larger device such as a cell phone, smart phone, flip-phone, PDA, graphic pad, or even larger devices such as a laptop computer, an automobile, and the like.

In an example embodiment of the invention, an apparatus comprises:

means for determining, by a wireless relay device, a first time window allocated for a first network, allowing first maximum transmit power for packet transmissions; and means for determining, by the wireless relay device, a second time window allocated for a second network, wherein the second time window is allowed for transmissions also within the first network, but only with second maximum transmit power that is lower than the first maximum transmit power.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments of the invention have been disclosed, a person skilled in the art will understand that changes can be made to the specific example embodiments without departing from the spirit and scope of the invention.

What is claimed is:

1. A method, comprising:
   receiving, by a wireless relay device, over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
   determining, by the wireless relay device, a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window.

2. The method of claim 1, further comprising:
   wherein the first network is a relay sub-network and the second network is a long range network.

3. The method of claim 2, further comprising:
   wherein the wireless relay device serves as a relay between the second network and stations in the first network.

4. The method of claim 1, further comprising:
   wherein the first time window and the second time window share at least partly a beacon interval of the access point in the second network.

5. A method, comprising:
   receiving, by a wireless relay device, over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
   determining, by the wireless relay device, a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window;
   wherein determining the first time window comprises sending a request to the access point and receiving a response.

6. The method of claim 1, further comprising:
   wherein determining the second time window comprises receiving a beacon message.

7. The method of claim 1, further comprising:
   wherein the second network is at least one of a wireless local area network and a sensor network.

8. A method, comprising:
   receiving, by a wireless relay device, over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
   determining, by the wireless relay device, a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window;
   wherein a maximum transmit power for the first time window is received in a message from the access point.

9. The method of claim 1, further comprising:
   wherein the first and second time windows are restricted access windows for IEEE 802.11ah technology.

10. An apparatus, comprising:
    at least one processor;
    at least one memory including computer program code;
    the at least one memory and the computer program code configured to, with the at least one processor, cause the apparatus at least to:
    receive over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
    determine a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window.

11. The apparatus of claim 10, further comprising:
wherein the first network is a relay sub-network and the second network is a long range network.

12. The apparatus of claim 11, further comprising:
wherein the wireless relay device serves as a relay between the second network and stations in the first network.

13. The apparatus of claim 10, further comprising:
wherein the first time window and the second time window share at least partly a beacon interval of the access point in the second network.

14. An apparatus, comprising:
at least one processor;
at least one memory including computer program code;
the at least one memory and the computer program code configured to, with the at least one processor, cause the apparatus at least to:
receive over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
determine a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window;
wherein determining the first time window comprises sending a request to the access point and receiving a response.

15. The apparatus of claim 10, further comprising:
wherein determining the second time window comprises receiving a beacon message.

16. The apparatus of claim 10, further comprising:
wherein the second network is at least one of a wireless local area network and a sensor network.

17. An apparatus, comprising:
at least one processor;
at least one memory including computer program code;
the at least one memory and the computer program code configured to, with the at least one processor, cause the apparatus at least to:
receive over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
determine a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window;
wherein a maximum transmit power for the first time window is received in a message from the access point.

18. The apparatus of claim 10, further comprising:
wherein the first and second time windows are restricted access windows for IEEE 802.11ah technology.

19. An apparatus, comprising:
at least one processor;
at least one memory including computer program code;
the at least one memory and the computer program code configured to, with the at least one processor, cause the apparatus at least to:
receive over a second network from an access point, an allocation of a first time window and transmit power restrictions for transmit power control of the wireless relay device and one or more wireless stations in a first network overlapping the second network, for exchanging over the first network with the one or more wireless stations, first packets having a first maximum transmit power for packet transmissions during the first time window; and
determine a second time window allocated for transmissions by the wireless relay device to the access point of second packets in the second network, wherein the second time window is allowed for exchanging with the one or more wireless stations, of the first packets in the first network, which overlap transmissions of the second packets in the second network, wherein the first packets are transmitted in the first network during the second time window, but only with second maximum transmit power during the second time window, indicated in the transmit power restrictions, that is lower than the first maximum transmit power for first packets transmitted during the first time window, so that interference by the transmissions of the first packets in the first network during the second time window, will be minimized with respect to transmissions of the second packets in the second network during the second time window;

wherein the second time window is used for at least one of: transmissions between the wireless relay device and an access point within the second network with normal transmit power that is greater than the second maximum transmit power, and transmissions between another station and the access point within the second network with normal transmit power and no first network transmissions.

20. The apparatus of claim 10, further comprising:
wherein determining the first time window comprises receiving a beacon from the access point, specifying the first time window.

21. The apparatus of claim 10, further comprising:
wherein the first network is a Wi-Fi direct peer-to-peer group.

* * * * *